United States Patent
Abledu

(10) Patent No.: US 10,447,137 B2
(45) Date of Patent: *Oct. 15, 2019

(54) ENERGY STORAGE, HYDROGEN AND OXYGEN PRODUCTION USING ION SEPARATORS

(71) Applicant: Kodzo Obed Abledu, Pasadena, CA (US)

(72) Inventor: Kodzo Obed Abledu, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,812

(22) Filed: Jul. 22, 2018

(65) Prior Publication Data
US 2019/0028012 A1    Jan. 24, 2019

Related U.S. Application Data

(60) Provisional application No. 62/535,843, filed on Jul. 22, 2017, provisional application No. 62/535,842, (Continued)

(51) Int. Cl.
*H02K 44/16* (2006.01)
*C25B 1/02* (2006.01)
(Continued)

(52) U.S. Cl.
CPC ............. *H02K 44/16* (2013.01); *B01D 61/08* (2013.01); *B01D 61/10* (2013.01); *B01D 61/12* (2013.01); *B03C 1/034* (2013.01); *B03C 1/0332* (2013.01); *C02F 1/44* (2013.01); *C25B 1/02* (2013.01); *H02K 1/165* (2013.01); *H02K 1/17* (2013.01);
(Continued)

(58) Field of Classification Search
CPC ........ H02K 44/16; H02K 1/185; H02K 44/12; H02K 7/18; H02K 1/22; H02K 5/124; H02K 2201/03; H02K 1/223; H02K 1/17; H02K 1/165; H02K 1/265; H02K 1/278; H01M 8/0656; H01M 2300/0002; C25B 1/02; B03C 1/002; B03C 1/02; B03C 1/023; B03C 1/025; B03C 1/029; B03C 1/03; B03C 1/033; B03C 1/0335; B03C 1/034; B03C 1/035; B03C 1/288; B03C 1/30; B03C 1/32; B03C 1/0332; B03C 2201/00; B03C 2201/18; B03C 2201/22; C02F 1/48; C02F 1/484; C02F 1/485; C02F 1/487;
(Continued)

(56) References Cited

U.S. PATENT DOCUMENTS 1,414,170 A * 4/1922 Bethke .................... B03C 1/23
  209/223.2
3,324,026 A * 6/1967 Waterman .............. B01D 35/06
  204/665

(Continued)

*Primary Examiner* — David C Mellon
(74) *Attorney, Agent, or Firm* — John K. Park; Park Law Firm

(57) ABSTRACT

An ion separating device comprising a stator cylinder with input and output ports, end caps, a rotor core, homopolar north poles, and homopolar south poles, is used to separate positive and negative ions in electrolyte introduced into the device. The resulting charged ionic solutions are stored in separate tanks. Energy recovery from the charged ionic solutions is accompanied by the release of gases thereby providing another process of producing hydrogen and oxygen.

13 Claims, 12 Drawing Sheets

Related U.S. Application Data filed on Jul. 22, 2017, provisional application No. 62/535,840, filed on Jul. 22, 2017, provisional application No. 62/535,844, filed on Jul. 22, 2017.

(51) Int. Cl.

| | | |
|---|---|---|
| *H02K 1/22* | (2006.01) | |
| *H02K 5/124* | (2006.01) | |
| *H02K 7/18* | (2006.01) | |
| *H02K 44/12* | (2006.01) | |
| *H02K 1/18* | (2006.01) | |
| *B03C 1/033* | (2006.01) | |
| *B03C 1/034* | (2006.01) | |
| *B01D 61/08* | (2006.01) | |
| *B01D 61/10* | (2006.01) | |
| *B01D 61/12* | (2006.01) | |
| *C02F 1/44* | (2006.01) | |
| *H02K 1/16* | (2006.01) | |
| *H02K 1/17* | (2006.01) | |
| *H02K 1/26* | (2006.01) | |
| *H02K 1/27* | (2006.01) | |
| *H01M 8/0656* | (2016.01) | |

(52) U.S. Cl.
CPC .............. *H02K 1/185* (2013.01); *H02K 1/22* (2013.01); *H02K 1/223* (2013.01); *H02K 1/265* (2013.01); *H02K 1/278* (2013.01); *H02K 5/124* (2013.01); *H02K 7/18* (2013.01); *H02K 44/12* (2013.01); *B03C 2201/22* (2013.01); *H01M 8/0656* (2013.01); *H01M 2300/0002* (2013.01); *H02K 2201/03* (2013.01)

(58) Field of Classification Search
CPC . C02F 1/481; C02F 1/483; C02F 1/44; B01D 61/08; B01D 61/12; B01D 61/10
See application file for complete search history.

(56) References Cited

U.S. PATENT DOCUMENTS

| | | | | |
|---|---|---|---|---|
| 3,451,918 | A * | 6/1969 | Kolin ..................... | B01D 57/02 204/600 |
| 3,608,718 | A * | 9/1971 | Aubrey, Jr. ............. | B03C 1/035 209/214 |
| 3,887,457 | A * | 6/1975 | Marston ................ | B03C 1/0335 209/214 |
| 4,217,213 | A * | 8/1980 | Schuster ................. | B03C 1/033 210/223 |
| 4,395,746 | A * | 7/1983 | Tanaka ..................... | B03C 1/24 134/1 |
| 5,932,096 | A * | 8/1999 | Saho ...................... | B03C 1/027 209/223.1 |
| 6,346,196 | B1 * | 2/2002 | Bose ........................ | B03C 1/01 209/214 |
| 2004/0114458 | A1 * | 6/2004 | Berthier .............. | B01F 13/0809 366/273 |
| 2004/0126273 | A1 * | 7/2004 | Forney ..................... | A23L 3/28 422/22 |
| 2010/0044934 | A1 * | 2/2010 | Taniguchi ........... | B01F 13/0809 266/234 |
| 2015/0299004 | A1 * | 10/2015 | Hofsajer ................. | C02F 1/485 210/695 |

\* cited by examiner

ENERGY STORAGE, HYDROGEN AND OXYGEN PRODUCTION USING ION SEPARATORS

RELATED APPLICATION

This application is a Non-provisional Application of Provisional Application Ser. Nos. 62/535,843 for "Energy Storage, Hydrogen and Oxygen Production using Ion Separators" filed on 22 Jul. 2017, 62/535,842 for "Ion Separator Water Pump" filed on 22 Jul. 2017, 62/535,840 for "Use of Ion Separator in Chemistry" filed on 22 Jul. 2017, 62/535,844 for "Electromagnetic Ion Separator" filed on 22 Jul. 2017.

BACKGROUND OF THE INVENTION

The present invention relates to an energy storage, hydrogen and oxygen production using ion separators.

The need for an energy storage, hydrogen and oxygen production using ion separators has been present for a long time considering the expansive demands in the everyday life. This invention is directed to solve these problems and satisfy the long-felt need.

SUMMARY OF THE INVENTION

The present invention contrives to solve the disadvantages of the prior art.

An aspect of the invention provides an ion separating device comprising a stator cylinder, a pair of end caps, a rotor core, a pair of homopolar north poles, and a pair of homopolar south poles.

The pair of end caps are provided on both end portions of the stator cylinder for enclosing the stator.

The drive shaft is disposed in the stator cylinder, extending from a right end portion of the stator cylinder to a left end portion of the stator cylinder, and configured to rotate with respect to the stator cylinder.

The rotor core is disposed around the drive shaft and comprising right rotor laminations disposed on a right side portion of the rotor core, left rotor laminations disposed on a left side portion of the rotor core, middle rotor laminations disposed between the right and left rotor core laminations, inner right comparting rotor laminations disposed between the right rotor core laminations and the middle rotor core laminations, inner left comparting rotor laminations disposed between the left rotor core laminations and the middle rotor core laminations, outer right comparting rotor laminations disposed at a right end portion of the right rotor core laminations, and outer left comparting rotor laminations disposed at a left end portion of the left rotor core laminations, so that the cavity between the rotor core and stator cylinder and enclosed by the pair of end caps is divided into a right outer compartment, a right inner compartment, a left outer compartment, a left inner compartment, and a middle compartment between the pair of end caps through four comparting seals installed between the stator cylinder and the right and left and inner and outer comparting rotor core laminations.

The pair of homopolar north poles are disposed close to a right end portion of the rotor core with a pair of air gaps over right rotor core laminations installed around the rotor core, and the pair of homopolar north poles are disposed so as to face each other on an upper side and a lower side of the rotor core through the stator cylinder.

The pair of homopolar south poles are disposed close to a left end portion of the rotor core with a pair of air gaps over left rotor core laminations installed around the rotor core, and the pair of homopolar south poles are disposed so as to face each other on an upper side and a lower side of the rotor core through the stator cylinder.

The ion separating device may further comprise a pair of rotor shaft seals installed between the drive shaft and the pair of end caps for preventing leakage along the drive shaft and an outermost surface of each of the pair of rotor shaft seals forms a seal with an inner surface of a bore provided in a corresponding one of the pair of end caps.

Each of the inner right and left rotor core laminations may comprise a circular sheet metal with cut-out portions provided along outer edges of the circular sheet metal, and wherein the circular sheet metal has a diameter that is slightly smaller than an inner diameter of the stator cylinder, and the middle rotor laminations have a diameter smaller than the diameter of the right and left rotor laminations, so as to form a recessed channel between the inner left and inner right comparting rotor cores.

Each of the inner and outer right and left comparting rotor laminations may comprise one or more first circular sheet metals having a diameter same as the diameter of the right and left rotor laminations and one or more second circular sheet metals having a diameter slightly smaller than the diameter of the right and left rotor laminations, and wherein each of the circular sheet metals of the inner and outer right and left comparting rotor laminations comprises a plurality of through-slots and the circular sheet metals are assembled so that the through-slots are aligned with one another.

The pair of homopolar north poles and the pair of homopolar south poles may comprise a pair of magnetic circuits, each of which comprising core members and field winding.

The pair of homopolar north poles and the pair of homopolar south poles may comprise a plurality of permanent magnets.

The ion separating device may further comprise two input ports that are disposed, and one of the two input ports is connected to the inner right compartment and another of the two input ports is connected to the inner left compartment.

The ion separating device may further comprise three output ports, which being disposed and connected to the outer right and outer left compartments and the middle compartment.

The ion separating device may further comprise a feeder pump, a first storage tank, and a second storage tank.

The feeder pump is installed between the two input ports and a pipe work for delivering electrolyte from a tank to the two input ports.

The first storage tank is connected to two of the three output ports and configured to receive and store an ionized fluid of a first polarity from the two output ports.

The second storage tank is connected to a remaining output port and configured to receive and store an ionized fluid of a second polarity from the remaining output port.

The ionized fluids of the first and second polarities in the first and second storage tanks are configured to be used as reagents in order to enhance a predetermined external chemical reaction.

The ion separating device may further comprise a first discharge pump and a second discharge pump.

The first discharge pump is configured to pump the ionized fluid of the first polarity to an energy recovery device.

The second discharge pump is configured to pump the ionized fluid of the second polarity to the energy recovery device.

The energy recovery device may comprise a first tank, a second tank, a first stainless-steel rod, and a second stainless-steel rod.

The first tank has electrodes and is configured to receive the ionized fluid of the first polarity pumped by the first discharge pump from the first storage tank.

The second tank has electrodes and is configured to receive the ionized fluid of the second polarity pumped by the second discharge pump from the second storage tank.

The first stainless-steel rod is disposed so as to stick out from the first tank.

The second stainless-steel rod is disposed so as to stick out from the second tank.

An energy is configured to be obtained by connecting the first stainless-steel rod with the second stainless-steel rod and releasing electrons.

The ion separating device may further comprise a first pump and a second pump.

The first pump is connected to the first tank, and the second pump is connected to the second tank.
When the ionized fluids of the first and second polarities are discharged fully turning into electrolytes the first and second pumps are configured to pump the electrolytes to the tank through pipes connecting from each of the first and second pumps to the tank.

The advantages of the present invention are: (1) the ion separating device according to the invention separates electrolyte into ionized fluids of opposite polarities easily; and (2) the ion separating device according to the invention provide a way for storing and retrieving energy conveniently.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

The U.S. Provisional Patent Application No. 62/535,843 for "Energy Storage, Hydrogen and Oxygen Production using Ion Separators" filed on 22 Jul. 2017, 62/535,842 for "Ion Separator Water Pump" filed on 22 Jul. 2017, 62/535,840 for "Use of Ion Separator in Chemistry" filed on 22 Jul. 2017, 62/535,844 for "Electromagnetic Ion Separator" filed on 22 Jul. 2017 are incorporated by reference herein for any and all purposes.

Referring to the figures, the embodiments of the invention are described in detail.

Figure 1:
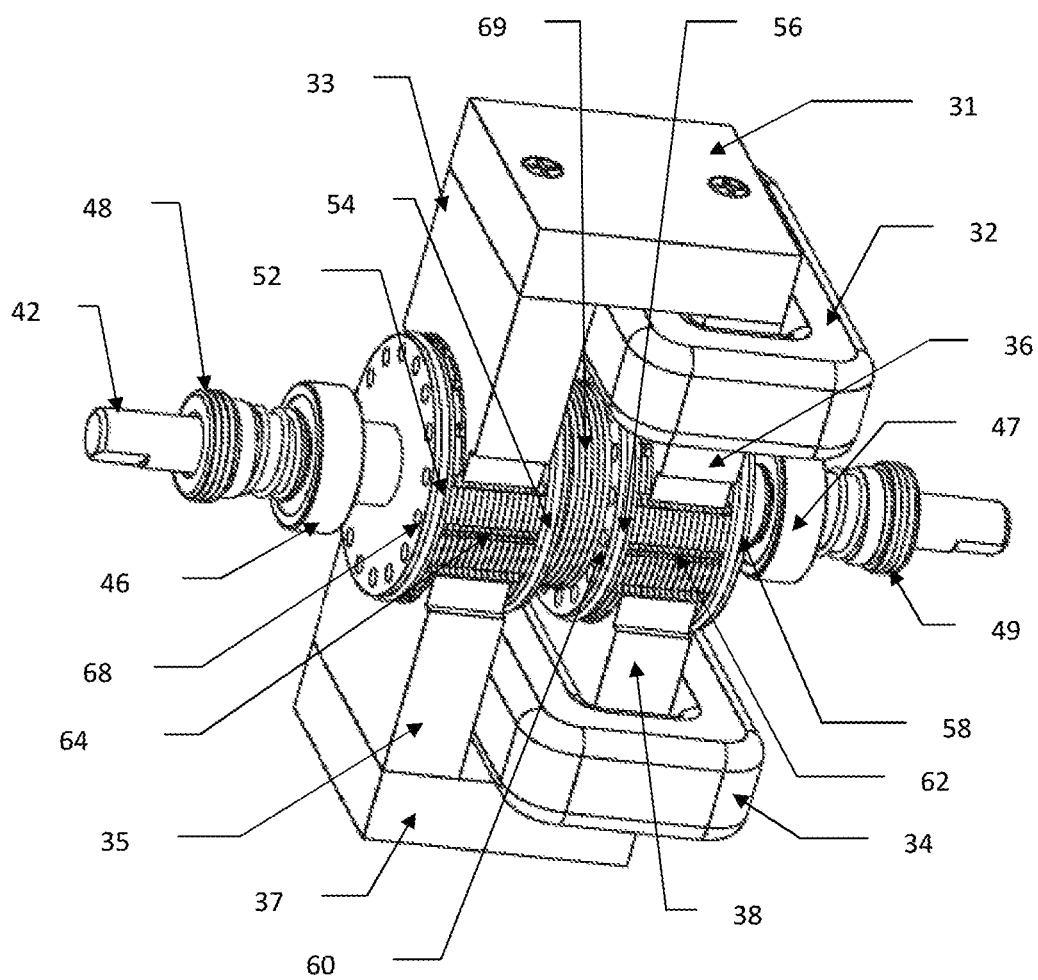
FIG. 1 is a perspective view of a rotor and magnetic circuit of an ion separator according to an embodiment of the invention.

The internal structure and magnetic circuits of the electromagnetic ion separator are shown in FIG. 1. The ion separator has two magnetic circuits. The first consists of core members labeled 33, 31, 36, the rotor armature, and two air gaps. This magnetic circuit is excited by field winding 32 and it makes core member 36 the north pole at the first air gap and core member 33 the south pole at the second air gap. The second magnetic circuit consists of core members 35, 37, 38, the rotor armature, and two air gaps. When energized by field winding 34, this magnetic circuit makes core member 38 the north pole at its air gap and core member 35 the south pole at the other air gap. These two magnetic field distributions form one homopolar north pole on the right portion of the ion separator rotor core and a homopolar south pole on the left portion of the rotor core.

The rotor is on a shaft 42 which has two seals 48 and 49 at either end to prevent leakage of the working fluid (electrolyte) that would be used in the device. Two bearings 46 and 47 located towards the shaft ends facilitate the rotation of the rotor. The core is built with four types of laminations. One type (type 1) is notched in the usual manner of dc-machine rotor laminations in which the cuts in the laminations are along the outer edge of the circular sheet metal. In the second and third types, the cuts do not cross the outer edge of the circular sheet metal but are wholly contained in the sheet metal. Type 3 has a slightly smaller diameter than type 2. Type 2 has the same diameter as type 1. Type 4 laminations do not have any outside slots. They have much smaller diameters and are used in the middle portion of the rotor core to form a recessed channel 69. The channel causes the magnetic fluxes to penetrate deeper into the rotor and pass under the channel to complete their circuits. This results in almost all the fluxes passing through the rotating electrolyte in the slots 62 and 64 and effecting more ion separation.

Type-1 laminations are used for the portions of the rotor core under the magnetic poles as shown in FIG. 1. Type-2 and type 3 laminations are used where seals are needed on the rotor. The cuts in the laminations are aligned to form paths in which liquid can flow along the axial length of the rotor. The path is from slot 68 on the left through slot 64 into the channel 69, continuing into slots 60 and 62 and unto the other end of the rotor core. The side openings created by slots 64 and 62 and channel 69 are locations at which fluid could enter or leave the rotor. These three side openings in addition to the two rotor ends constitute a total of five points of entry or egress for the electrolyte.

Four seals 52, 54, 56, and 58 on the rotor divide the cavity between the rotor core and stator cylinder into five separate compartments. Each seal sits in a groove. The groove is created by using one or more type 3 laminations (with diameters that are slightly smaller than the core diameter) flanged by one type 2 laminations on either side. The outer diameter of the type 3 lamination marches the internal diameters of the seals.

Figure 2:
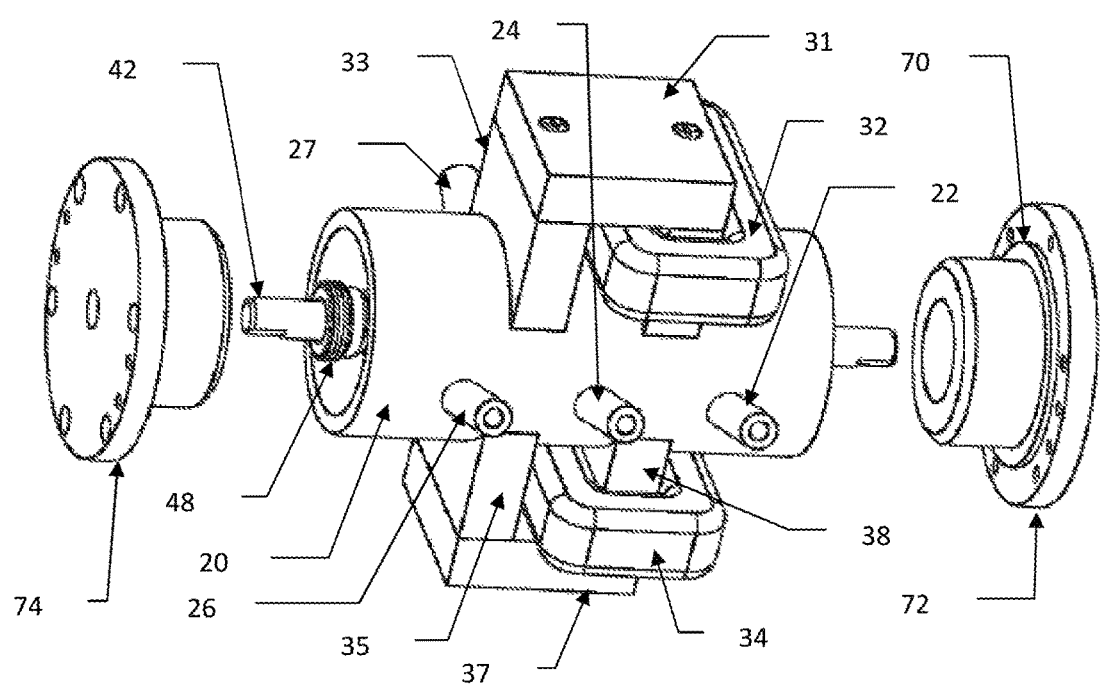
FIG. 2 is an exploded perspective view of a rotor, magnetic circuit, stator parts of an ion separator view from an output side according to an embodiment of the invention.
Figure 3:
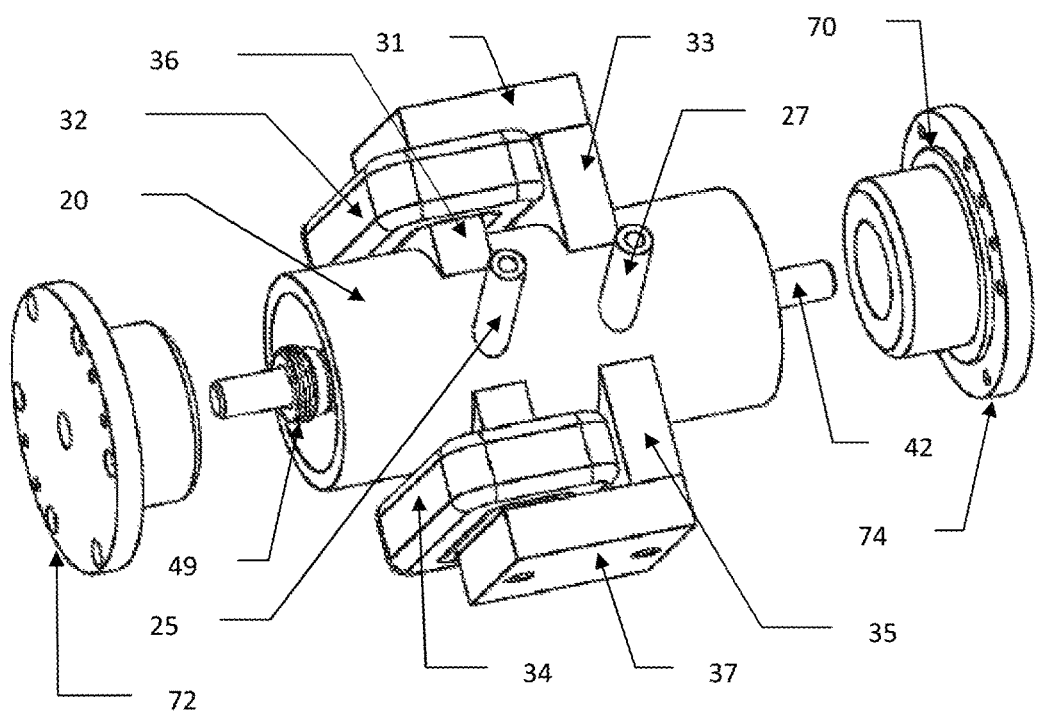
FIG. 3 is an exploded perspective view of a rotor, magnetic circuit, stator parts of an ion separator view from an input side according to an embodiment of the invention.

FIG. 2 shows the stator in place over the rotor. The stator consists of a nonmagnetic pipe 20 with five smaller tubes, 22, 24, 26, (25 and 27 shown in FIG. 3) welded into it. The stator pipe 20 is cylindrical, smooth on the inside, and inert to the working fluid. The seals 52, 54, 56, and 58 are in contact with both the rotor and the inner surface of the stator. The shaft seals 48 and 49, in addition to the bearings 46 and 47 are housed in two end caps 72 and 74 which fit snugly into the stator thus centering the rotor. A rubber gasket 70 is used on each end cap to prevent leakage. The five smaller tubes 22, 24, 26, 25 and 27 are located directly above the five compartments created by the four seals 52, 54, 56, and 58. These smaller tubes form the ports into these compartments. The tubes 22, 24, and 26 are the output ports while tubes 25 and 27 in FIG. 3 are the input ports. The input ports are located near the middle of the poles.

Figure 4:
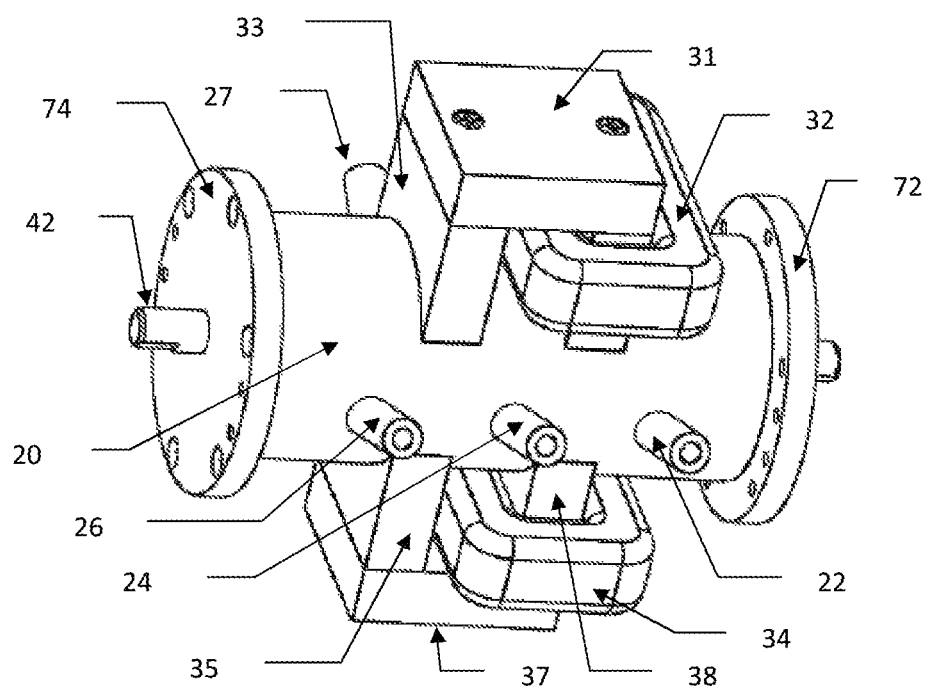
FIG. 4 is a perspective view of a rotor, magnetic circuits, closed stator parts of an ion separator view from an output side according to an embodiment of the invention.

FIG. 4 shows the device with the end caps closed.

Figure 5:
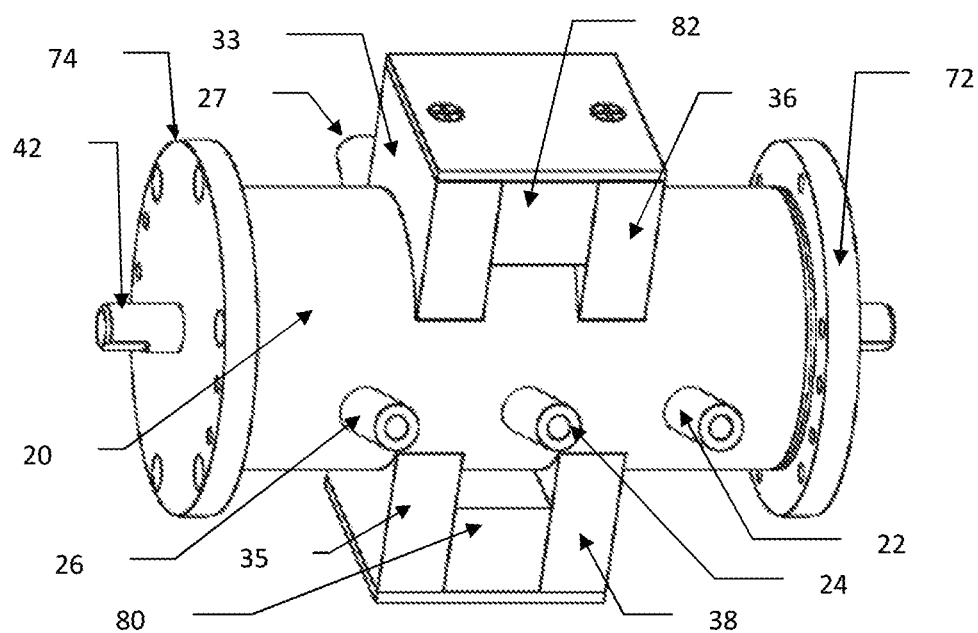
FIG. 5 is a perspective view of a rotor, magnetic circuits, closed stator parts of an ion separator view from an output side as an alternate construction of an ion separator using permanent magnets according to another embodiment of the invention.

External permanent magnets could be employed to create the magnetic fields instead of using field windings. FIG. 5 shows the placement of two permanent magnets 80 and 82 to accomplish this task. The magnets are oriented to make core members 36, 38 the north poles and 33, 35 to be south poles at their respective air gaps.

Figure 6:
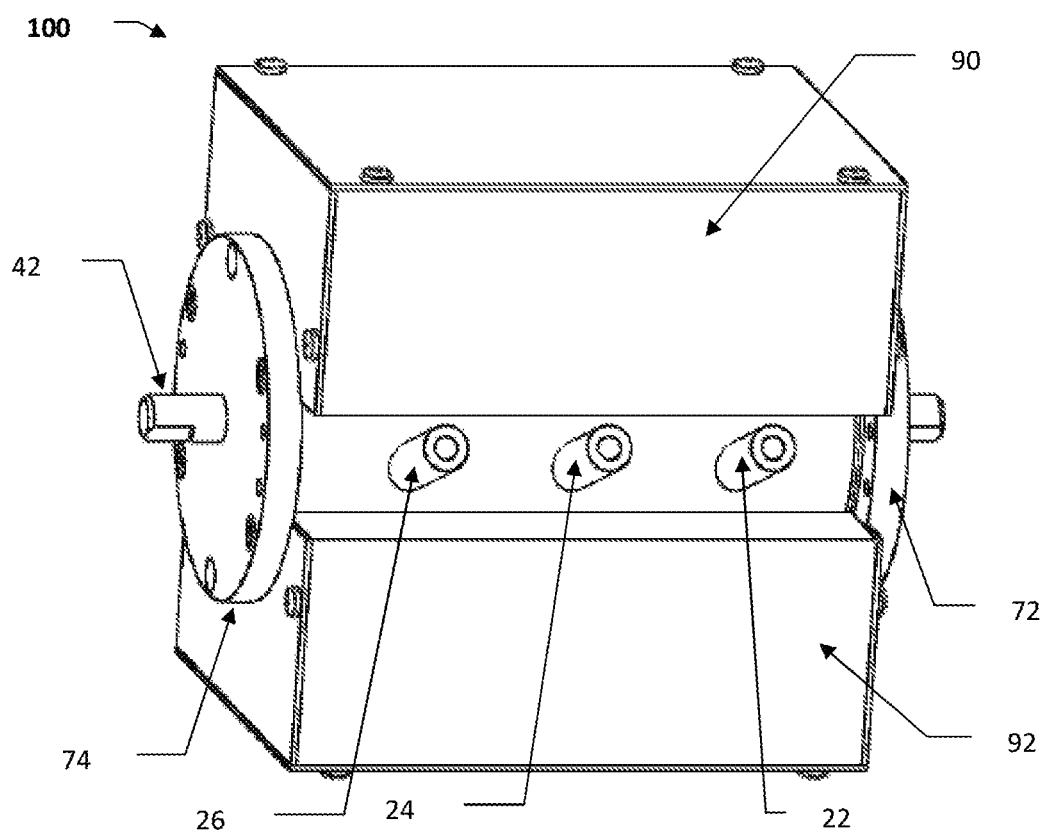
FIG. 6 is a perspective view of a fully-assembled ion separator viewed from an output side according to an embodiment of the invention.

FIG. 6 shows the output side and the housings 90, and 92 used for the ion separator 100. The housings cover all the internal parts but leave the shaft ends and the ports accessible.

Figure 7:
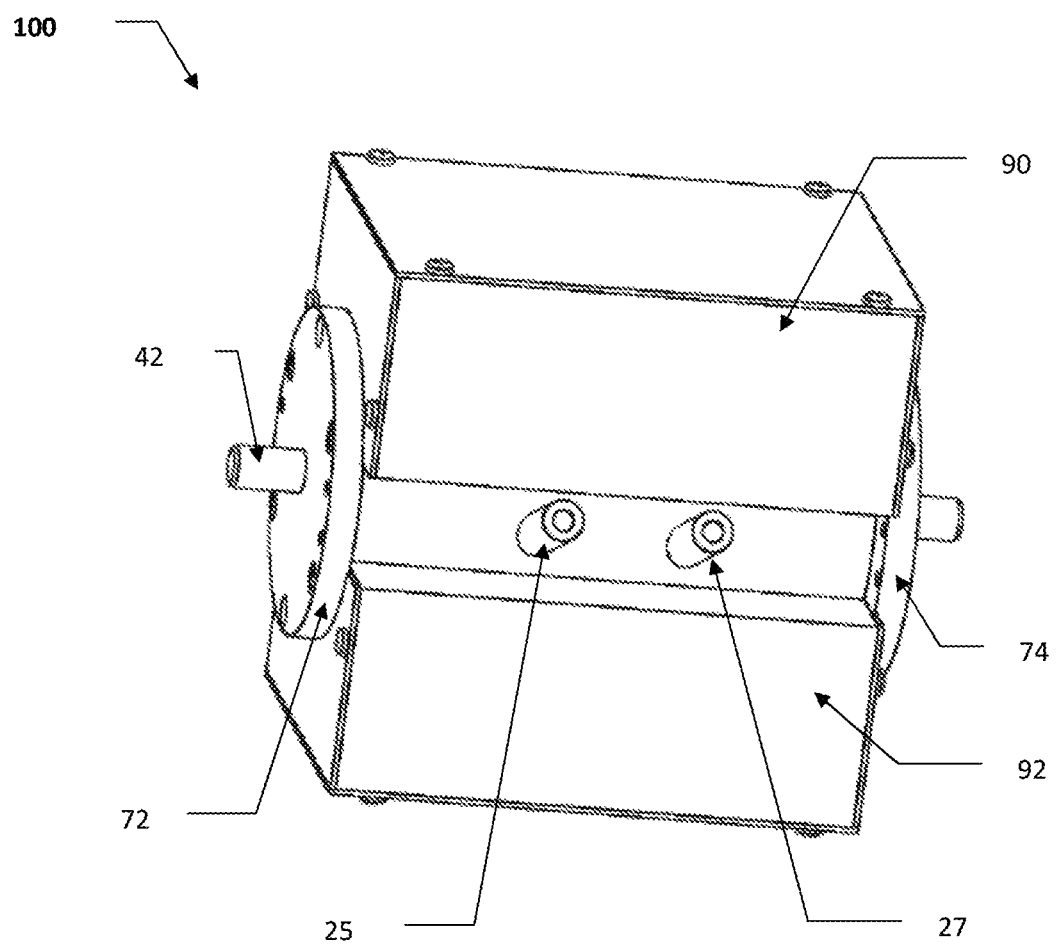
FIG. 7 is a perspective view of a fully-assembled ion separator viewed from an input side according to an embodiment of the invention.

FIG. 7 shows the input side of the fully-assembled ion separator 100.

Operation of the Ion Separator

Referring to FIG. 7 and FIG. 1, assuming electrolyte is being pumped into the input ports 25 and 27 of the ion separator, the electrolyte would enter the rotor slots 62 and 64 and some would flow into channel 69 and come out of the output port 24 (of FIG. 6). The rest of the electrolyte would proceed towards the outer ends of slots 62 and 64 into the space between the rotor core and the end caps and eventually come out through ports 22 and 26 (of FIG. 6). If the two magnetic fields are excited, then rotating the shaft 42 clockwise (from the right end shown in FIG. 1) would create forces on the positive ions that rotate in the magnetic fields to move towards channel 69 located in the middle of the rotor and exit port 24 as electrolyte is being pumped continuously into the input ports. In like manner negative ions would experience forces towards the outer ends of the rotor and exit through ports 22 and 26. Storage of these opposite-charged electrolytes in separate tanks constitutes energy storage.

Some Comments about the Device Construction:

To prevent rusting and other undesired chemical reactions, all surfaces in contact with the working fluid are either made of chemically-inert material or covered with a chemically-inert and electrically-insulating material. The configuration described in FIG. 1 is not the only way to build ion separators. Other configurations that use permanent magnets inserted into the stator cylinder are possible ways of realizing the desired magnetic field distribution. Regular dc machine field windings located within their stators could also be reconfigured (in two dc machines) to get the two homopolar magnetic fields needed for the ion separator.

The Ion-Separation Energy Storage System

Figure 8:
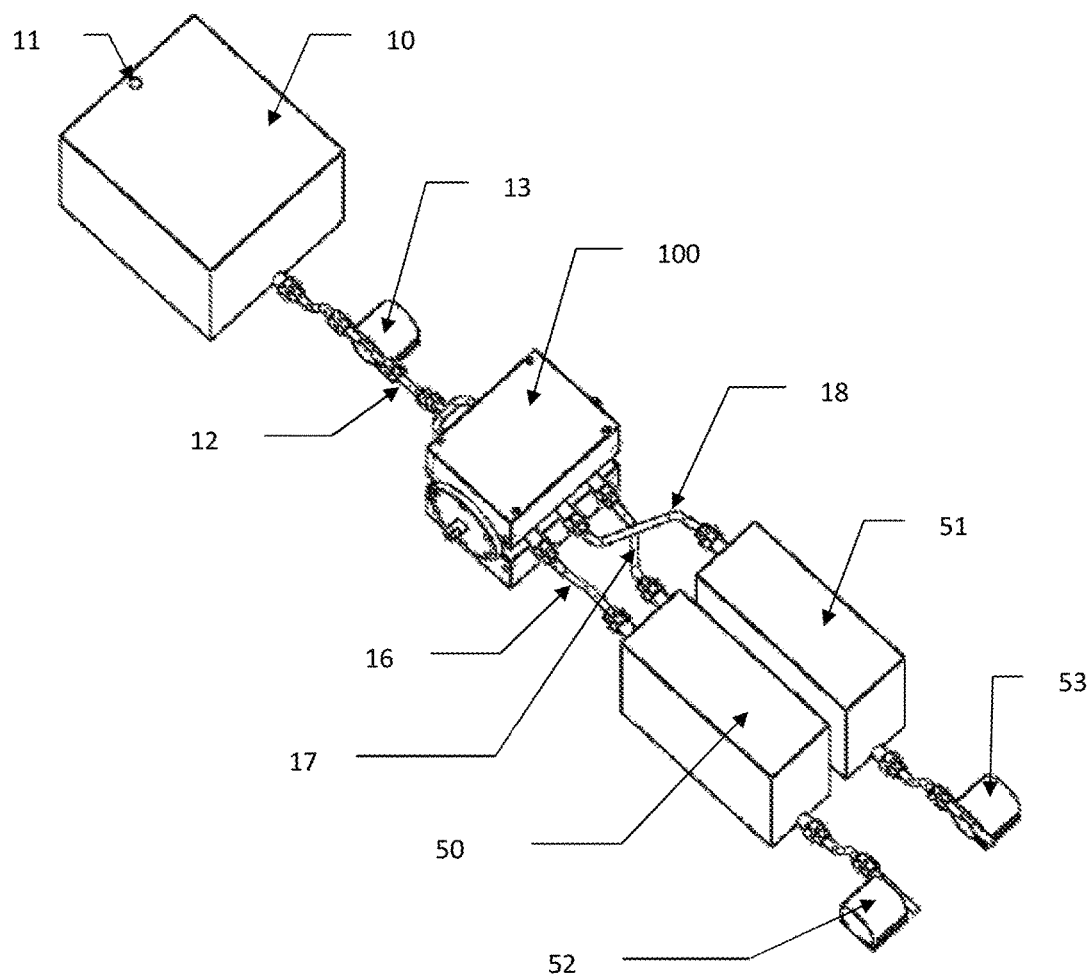
FIG. 8 is a perspective view of an ion-separation energy storage system according to an embodiment of the invention.
Figure 9:
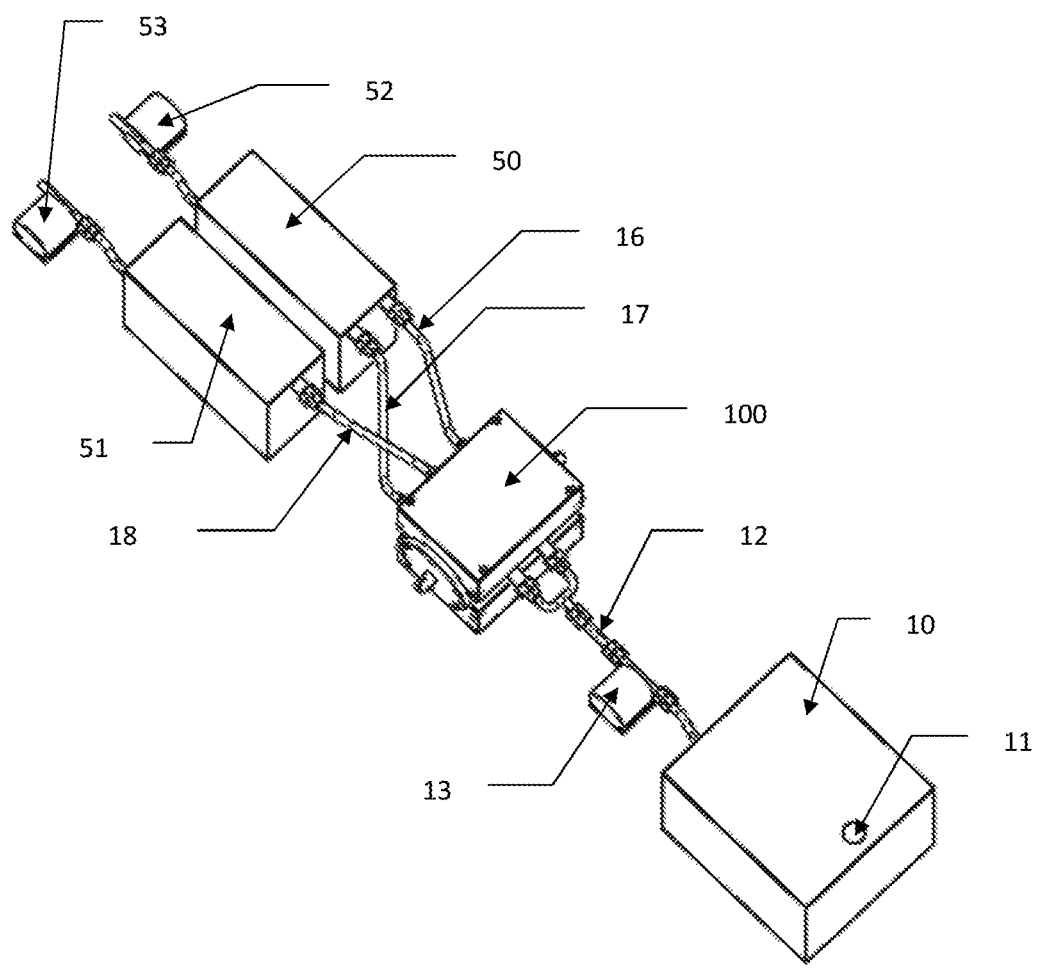
FIG. 9 is another perspective view of the ion-separation energy storage system of FIG. 8.

The ion-separation energy storage system shown in FIG. 8 and FIG. 9 has a tank 10 with inlet 11. The tank 10 is filled with electrolyte. Feeder pump 13 delivers the electrolyte through tube 12 and T connector into the two inlet ports of the ion separator 100. (The ion separator would be run by mechanical drive coupled to its shaft). The output from the ion separator goes through three tubes 16, 17 and 18 into the storage tanks 50 and 51. The two tubes 16 and 17 carry the same type of ionized fluid (containing negative ions) into tank 50 while the third tube 18 carries fluid with ions of opposite polarity (positive ions) into tank 51. Two discharge pumps 52 and 53 would be used to pump the negatively-charged and positively-charged electrolytes to energy recovery units.

Energy Recovery with Resulting Hydrogen and Oxygen Production

Energy recovery would involve the use of appropriately-designed recovery units. A simplified energy recovery scheme illustrated in FIG. 10, FIG. 11, and FIG. 12 involves the pumping of the positively-charged electrolyte into a tank 61 in which electrodes are installed with a stainless-steel rod 63 (that is attached to the electrodes) sticking out of the tank. The negatively-charged electrolyte is pumped into tank 60 which also has a protruding stainless-steel rod 62 connected to the electrodes in tank 60. Connecting an external circuit between the protruding rods 63 and 62 would result in energy recovery as electrons are released from the negatively-charged electrolyte through the external circuit to the positively-charged electrolyte. Simple chemical reactions in equations like those shown below would take place releasing hydrogen (from the positively-charged electrolyte in tank 61) and oxygen (from the negatively-charged electrolyte in tank 60) if potassium hydroxide (KOH) is the solute and water ($H_2O$) the solvent of the electrolyte.

$$4OH^- \rightarrow 2H_2O + O_2 + 4e^-$$

$$4K^+ + 4H_2O + 4e^- \rightarrow 4KOH + 2H_2$$

Similar equations can be written if other compounds are used for the electrolyte. The energy extracted by the external circuit could be used for any purpose or be pumped into the electric power system. When the electrolytes are fully discharged, pump 66 and pump 69 send them back into the electrolyte tank 10 through pipes 75 and 73 to repeat the cycle. Extra water would be added to the tank 10 as gas production progresses to maintain the electrolyte concentration levels within a desirable range. The oxygen released in tank 60 goes through connecting tubes 70 at the top of tank 60 into another tank 71 from where compressor 57 evacuates it into storage cylinder 58. The hydrogen gas produced is also evacuated by compressor 68 into a storage cylinder 65 via tube 67.

Figure 10:
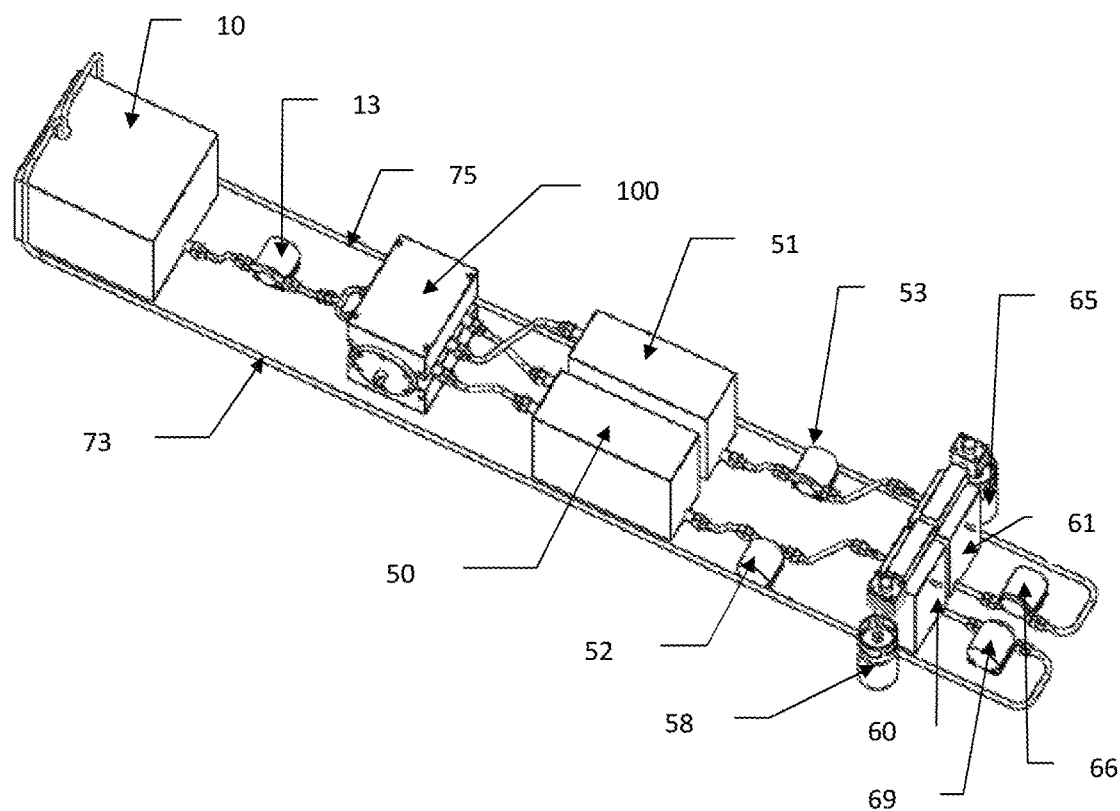
FIG. 10 is a perspective view of an energy storage and recovery system for hydrogen and oxygen production according to an embodiment of the invention.
Figure 11:
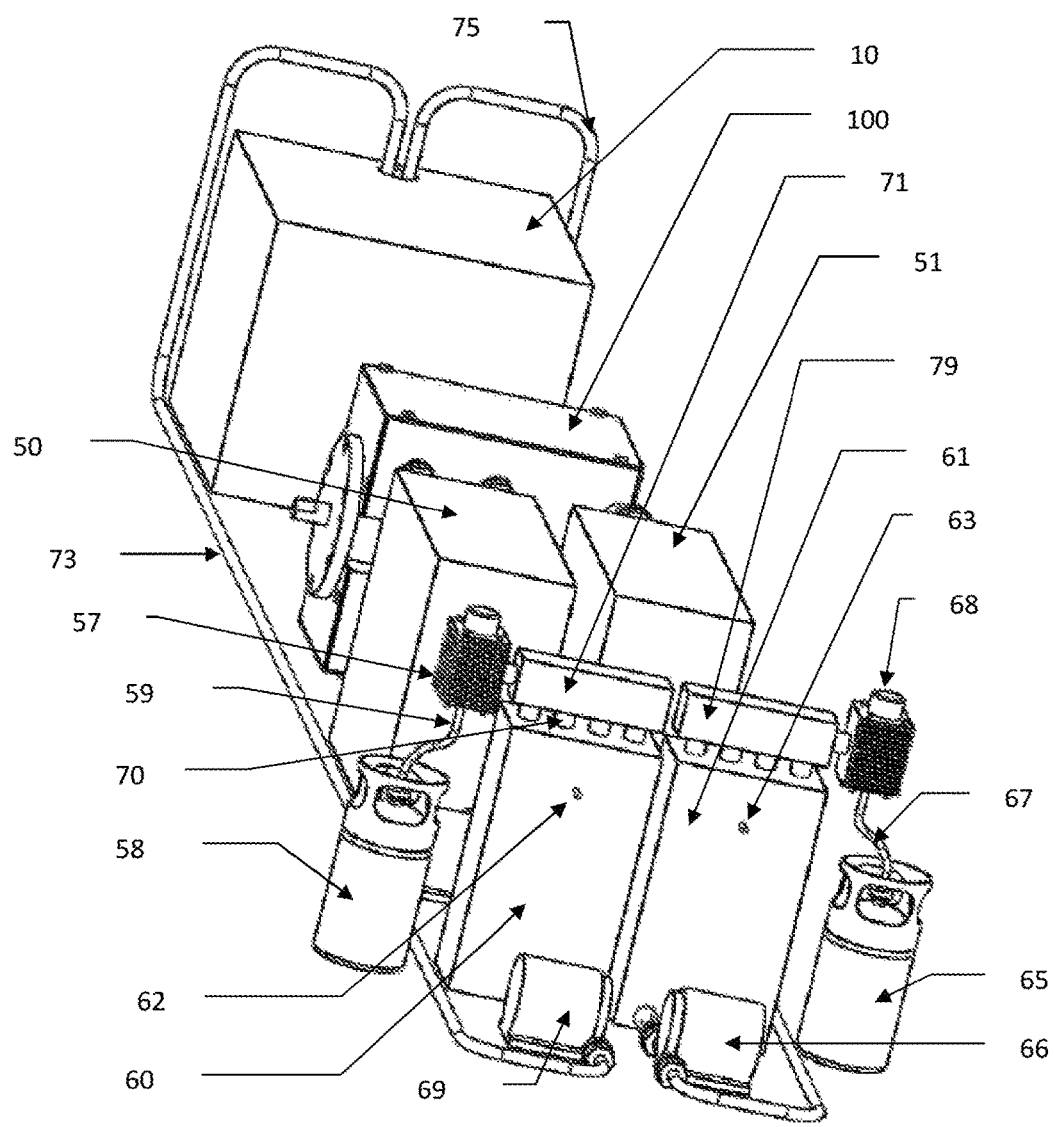
FIG. 11 is another perspective view of an energy storage and recovery system for hydrogen and oxygen production according to an embodiment of the invention.

FIG. 11 is a frontal view of the energy storage and recovery arrangement in FIG. 10 showing the major components in more details.

Figure 12:
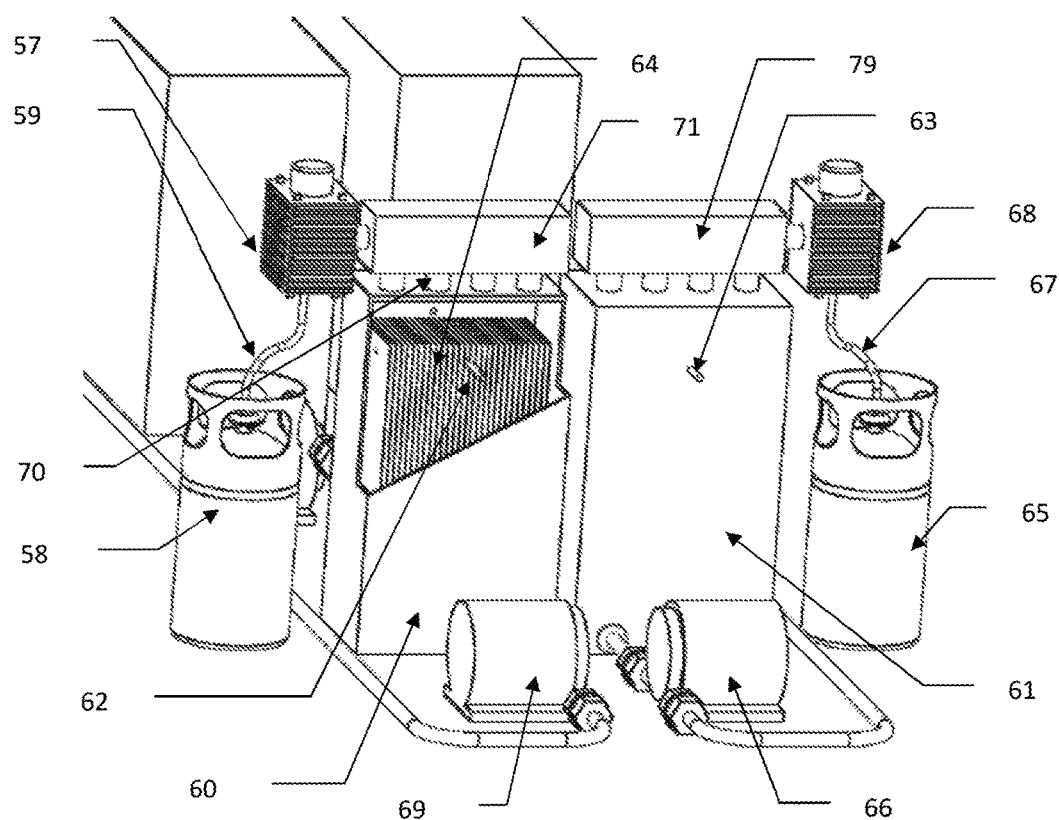
FIG. 12 is an expanded front and cut-out view of a recovery tank having electrodes according to an embodiment of the invention.

FIG. 12 is a more detailed partial illustration of the later stages of FIG. 11. A cut-away section is shown of tank 60 to reveal the electrodes 64 contained in it and the rod 62 connected to the electrodes 64.

If the tanks (60, 61, 71 and 79) are built as pressure vessels, the released gasses would self-compress and the compressors 57 and 68 could be eliminated. That would eliminate the energy needed for the compression.

- Creation of multiple homo-polar magnetic fields on a common shaft and core for use in separating ions in electrolytes.
- An electromagnetic machine that is used to separate ions in electrolytes.
- Creation of an air-gap channel on the rotor to limit leakage fluxes and to enhance the passage of fluxes through electrolyte in the rotating rotor slots for enhanced electromagnetic ion separation.
- Using homopolar magnetic fields and electrolyte rotation in these fields to separate positive and negative ions in the electrolyte.
- Creation of end openings in the rotor core to allow the outflow of charged electrolyte into the end regions of the rotor and out of the rotor.
- Creation of five compartments in the cavity between the rotor core and the stator cylinder that hold fluids of different composition resulting from ion separation.
- Injecting the electrolytes into an area near the middle of the magnetic poles to shorten the distance each ion travels to reach an exit port.
- Creation of ports on the stator to facilitate introduction of electrolytes into the rotor and the removal of electrolytes of different compositions "generated" inside the rotating rotor slots.
- Converting mechanical energy into electrochemical energy by separating ions in electrolytes rotated in confined homo-polar magnetic fields.
- Electrochemical energy storage in electrolytes by using ion separators to separate the positive and negative ions and then storing them in different tanks.
- Hydrogen and oxygen production resulting from ion separation in electrolyte followed by energy recovery.
- Hydrogen and oxygen production from electrolyte using mechanical energy input instead of electrical energy input.
- A methodology that could use a wide variety of salts or chemicals for energy storage.
- A machine that provides a means to store renewable electrical energy by using an electric motor to drive the ion separator in the energy storage system.

An aspect of the invention provides a device capable of separating ions in electrolytes pumped into it comprising a stator cylinder, a pair of end caps, a rotor core, a pair of homopolar north poles, and a pair of homopolar south poles.

The pair of end caps are provided on both end portions of the stator cylinder for forming a cavity between the rotor core and the stator cylinder.

The drive shaft is disposed in the stator cylinder, extending from a right end portion of the stator cylinder to a left end portion of the stator cylinder, and configured to rotate with respect to the stator cylinder.

The rotor core is disposed around the drive shaft and comprising right rotor laminations disposed on a right side portion of the rotor core, left rotor laminations disposed on a left side portion of the rotor core, middle rotor laminations disposed between the right and left rotor core laminations, inner right comparting rotor laminations disposed between the right rotor core laminations and the middle rotor core laminations, inner left comparting rotor laminations disposed between the left rotor core laminations and the middle rotor core laminations, outer right comparting rotor laminations disposed at a right end portion of the right rotor core laminations, and outer left comparting rotor laminations disposed at a left end portion of the left rotor core laminations, so that the cavity between the rotor core and stator cylinder and enclosed by the pair of end caps is divided into a right outer compartment, a right inner compartment, a left outer compartment, a left inner compartment, and a middle compartment between the pair of end caps through four comparting seals (52, 54, 56, 58) installed between the stator cylinder and the right and left and inner and outer comparting rotor core laminations.

The pair of homopolar north poles are disposed close to a right end portion of the rotor core with a pair of air gaps over right rotor core laminations installed around the rotor core, and the pair of homopolar north poles are disposed so as to face each other on an upper side and a lower side of the rotor core through the stator cylinder.

The pair of homopolar south poles are disposed close to a left end portion of the rotor core with a pair of air gaps over left rotor core laminations installed around the rotor core, and the pair of homopolar south poles are disposed so as to face each other on an upper and a lower side of the rotor core through the stator cylinder.

The ion separating device may further comprise a pair of rotor shaft seals (48, 49) installed between the drive shaft and the pair of end caps for preventing leakage along the drive shaft and an outermost surface of each of the pair of rotor shaft seals (48, 49) forms a seal with an inner surface of a bore provided in a corresponding one of the pair of end caps.

Each of the inner right and left rotor laminations may comprise a circular sheet metal with cut-out portions provided along outer edges of the circular sheet metal, and wherein the circular sheet metal has a diameter that is slightly smaller than an inner diameter of the stator cylinder, and the middle rotor laminations have a diameter smaller than the diameter of the right and left rotor laminations, so as to form a recessed channel between the inner left and inner right rotor cores.

Each of the inner and outer right and left comparting rotor laminations may comprise one or more first circular sheet metals having a diameter same as the diameter of the right and left rotor laminations and one or more second circular sheet metals having a diameter slightly smaller than the diameter of the right and left rotor laminations, and wherein each the circular sheet metals of the inner and outer right and left comparting rotor laminations comprises a plurality of through-slots and the circular sheet metals are assembled so that the through-slots are aligned with one another.

The pair of homopolar north poles and the pair of homopolar south poles may comprise a pair of magnetic circuits, each of which comprising core members and field winding.

The pair of homopolar north poles and the pair of homopolar south poles may comprise a plurality of permanent magnets.

The ion separating device may further comprise two input ports (25, 27) are disposed, and one of the two input ports is connected to the inner right compartment and another of the two input ports is connected to the inner left compartment.

The ion separating device may further comprise three output ports (22, 24, 26), which being disposed and connected to the outer right and outer left compartments and the middle compartment.

The ion separating device may further comprise a feeder pump (13), a first storage tank (50), and a second storage tank (51).

The feeder pump (13) is installed between the two input ports and a pipe work for delivering electrolyte from a tank (10) to the two input ports.

The first storage tank (50) is connected to two of the three output ports and configured to receive and store an ionized fluid of a first polarity from the two output ports.

The second storage tank (51) is connected to a remaining output port and configured to receive and store an ionized fluid of a second polarity from the remaining output port.

The ionized fluids of the first and second polarities in the first and second storage tanks (50, 51) are configured to be used as reagents in order to enhance a predetermined external chemical reaction.

The ion separating device may further comprise a first discharge pump (52) and a second discharge pump (53).

The first discharge pump (52) is configured to pump the ionized fluid of the first polarity to an energy recovery device.

The second discharge pump (53) is configured to pump the ionized fluid of the second polarity to the energy recovery device.

The energy recovery device may comprise a first tank (60), a second tank (61), a first stainless-steel rod (62), and a second stainless-steel rod (63).

The first tank (60) has electrodes and is configured to receive the ionized fluid of the first polarity pumped by the first discharge pump (52) from the first storage tank (50).

The second tank (61) has electrodes and is configured to receive the ionized fluid of the second polarity pumped by the second discharge pump (53) from the second storage tank (51).

The first stainless-steel rod (62) is disposed so as to stick out from the first tank (60).

The second stainless-steel rod (63) is disposed so as to stick out from the second tank (61).

An energy is configured to be obtained by connecting the first stainless-steel rod (62) with the second stainless-steel rod (63) and releasing electrons.

The ion separating device may further comprise a first pump (66) and a second pump (69).

The first pump (66) is connected to the first tank (60), and the second pump (69) is connected to the second tank (61).

When the ionized fluids of the first and second polarities are discharged fully turning into electrolytes the first and second pumps (66, 69) are configured to pump the electrolytes to the tank (10) through pipes (73, 75) connecting from each of the first and second pumps (66, 69) to the tank (10).

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. An ion separating device comprising:
    a stator cylinder;
    a pair of end caps provided on a right end portion and a left end portion of the stator cylinder for forming a cavity for containing fluids;
    a drive shaft disposed in the stator cylinder, extending from the right end portion of the stator cylinder to the left end portion of the stator cylinder, and configured to rotate with respect to the stator cylinder;
    a rotor core disposed around the drive shaft and comprising right rotor core laminations disposed on a right side portion of the rotor core, left rotor core laminations disposed on a left side portion of the rotor core, middle rotor core laminations disposed between the right and left rotor core laminations, right inner comparting rotor core laminations disposed between the right rotor core laminations and the middle rotor core laminations, left inner comparting rotor core laminations disposed between the left rotor core laminations and the middle rotor core laminations, outer right comparting rotor core laminations disposed at a right end portion of the right rotor core laminations, and outer left comparting rotor core laminations disposed at a left end portion of the left rotor core laminations, so that the cavity between the rotor core and stator cylinder, and enclosed by the pair of end caps, is divided into a right outer compartment, a right inner compartment, a left outer compartment, a left inner compartment, and a middle compartment;
    a pair of homopolar north poles disposed close to a right end portion of the rotor core with a pair of air gaps over the right rotor core laminations installed around the rotor core, wherein the pair of homopolar north poles are disposed so as to face each other on an upper side and a lower side of the rotor core through the stator cylinder; and
    a pair of homopolar south poles disposed close to a left end portion of the rotor core with a pair of air gaps over the left rotor core laminations installed around the rotor core, wherein the pair of homopolar south poles are disposed so as to face each other on an upper side and a lower side of the rotor core through the stator cylinder; wherein the stator cylinder further comprises one or more input ports into which an electrolyte carrying fluid enters and a plurality of output ports from which the electrolyte carrying fluid exits so that the rotation of the drive shaft forces ions to be separated.

2. The ion separating device of claim 1, further comprising a pair of rotor shaft seals installed between the drive shaft and the pair of end caps for preventing leakage along the drive shaft and an outermost surface of each of the pair of rotor shaft seals forms a seal with an inner surface of a bore provided in a corresponding one of the pair of end caps.

3. The ion separating device of claim 2, wherein each of the right and the left rotor core laminations comprises a circular sheet metal with cut-out portions provided along outer edges of the circular sheet metal, and wherein the circular sheet metal has a diameter that is slightly smaller than an inner diameter of the stator cylinder, and wherein the middle rotor core laminations have a diameter smaller than the diameter of the right and left comparting rotor core laminations, so as to form a recessed channel between an inner left and an inner right rotor cores.

4. The ion separating device of claim 3, wherein each of the right and left inner and outer comparting rotor core laminations comprise one or more first circular sheet metals having a diameter same as the diameter of the right and left rotor core laminations and one or more second circular sheet metals having a diameter slightly smaller than the diameter of the right and left rotor core laminations, and wherein each of the circular sheet metals of the right and left inner and outer comparting rotor core laminations comprises a plurality of through-slots and the circular sheet metals are assembled so that the through-slots are aligned with one another.

5. The ion separating device of claim 1, wherein the pair of homopolar north poles and the pair of homopolar south poles comprise a pair of magnetic circuits.

6. The ion separating device of claim 1, wherein the pair of homopolar north poles and the pair of homopolar south poles comprise a plurality of permanent magnets.

7. The ion separating device of claim 1, wherein the one or more of input ports is a first input port connected to the right inner compartment and a second input port connected to the left inner compartment.

8. The ion separating device of claim 7, wherein the plurality of output ports comprise of three output ports wherein each of the three output ports is individually connected to the right outer compartment and the left outer compartment and the middle compartment, respectively.

9. The ion separating device of claim 8, further comprising:
 a feeder pump installed between the first input port and the second input port and a pipe work for delivering electrolyte from a tank to the first input port and the second input port;
 a first storage tank connected to two of the three output ports and configured to receive and store an ionized fluid of a first polarity from the two output ports; and
 a second storage tank connected to a remaining output port and configured to receive and store an ionized fluid of a second polarity from the remaining output port.

10. The ion separating device of claim 9, wherein the ionized fluids of the first and second polarities in the first and second storage tanks are configured to be used as reagents in order to enhance a predetermined external chemical reaction.

11. The ion separating device of claim 10, further comprising:
 a first discharge pump configured to pump the ionized fluid of the first polarity to an energy recovery device; and
 a second discharge pump configured to pump the ionized fluid of the second polarity to the energy recovery device.

12. The ion separating device of claim 11, wherein the energy recovery device comprises:
 a first tank having electrodes and configured to receive the ionized fluid of the first polarity pumped by the first discharge pump from the first storage tank;
 a second tank having electrodes and configured to receive the ionized fluid of the second polarity pumped by the second discharge pump from the second storage tank;
 a first stainless-steel rod disposed so as to stick out from the first tank; and
 a second stainless-steel rod disposed so as to stick out from the second tank,
 wherein an energy is configured to be obtained by connecting the first stainless-steel rod with the second stainless-steel rod and releasing electrons.

13. The ion separating device of claim 12, further comprising:
 a first pump connected to the first tank; and
 a second pump connected to the second tank,
 wherein when the ionized fluids of the first and second polarities are discharged fully turning into electrolytes the first and second pumps are configured to pump the electrolytes to the tank through pipes connecting from each of the first and second pumps to the tank.

* * * * *